United States Patent
Suzuki

(10) Patent No.: US 8,197,632 B2
(45) Date of Patent: Jun. 12, 2012

(54) METHOD FOR PRODUCING FUEL CELL ELECTROLYTE MEMBRANE AND METHOD FOR PRODUCING MEMBRANE-ELECTRODE ASSEMBLY

(75) Inventor: Hiroshi Suzuki, Aichi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 339 days.

(21) Appl. No.: 12/304,819

(22) PCT Filed: Jun. 18, 2007

(86) PCT No.: PCT/JP2007/062643
§ 371 (c)(1),
(2), (4) Date: Dec. 15, 2008

(87) PCT Pub. No.: WO2008/001701
PCT Pub. Date: Jan. 3, 2008

(65) Prior Publication Data
US 2009/0173442 A1 Jul. 9, 2009

(30) Foreign Application Priority Data
Jun. 26, 2006 (JP) .................................. 2006-175324

(51) Int. Cl.
*B29C 65/00* (2006.01)
*B32B 37/00* (2006.01)
(52) U.S. Cl. ........ 156/297; 156/219; 156/285; 156/298; 429/483; 429/494; 429/535; 427/115
(58) Field of Classification Search .................. 429/482, 429/483, 491, 492, 493, 494, 35, 535; 156/212, 156/219, 283, 297, 308.2, 309.6, 285, 298; 427/115, 202, 203, 375
See application file for complete search history.

(56) References Cited

U.S. PATENT DOCUMENTS
2,219,447 A * 10/1940 Groff ............................ 156/280
(Continued)

FOREIGN PATENT DOCUMENTS
JP 60109176 A * 6/1985
(Continued)

OTHER PUBLICATIONS
Machine translation of JP 09063622 date unknown.*
(Continued)

*Primary Examiner* — John Goff
(74) *Attorney, Agent, or Firm* — Finnegan, Henderson, Farabow, Garrett & Dunner, LLP

(57) ABSTRACT

According to the present invention, an electrolyte membrane having recesses and projections on the surface thereof is obtained. In addition, a membrane-electrode assembly comprising the electrolyte membrane, in which the effective contact area between the electrolyte membrane surface and an electrode catalyst layer is increased, is obtained. An electrolyte membrane 1 which comprises a fluorine-based electrolyte is heated and pressed with the use of plates 10*a* and 10*b* each having recesses and projections 11 on the surface thereof such that recesses and projections 2*a* and 2*b* are formed on the surface of the electrolyte membrane 1. Thereafter, the electrolyte membrane 1 is subjected to a treatment for imparting ion exchange properties to an electrolyte polymer, such as hydrolysis, such that an electrolyte membrane 3 having recesses and projections on the surface thereof is obtained. Electrode catalyst layers 21*a* and 21*b* are separately laminated on the both surfaces of the electrolyte membrane 3 such that a membrane-electrode assembly 20 is obtained.

4 Claims, 4 Drawing Sheets

U.S. PATENT DOCUMENTS

| | | | |
|---|---|---|---|
| 5,738,905 A * | 4/1998 | Bevers | 427/115 |
| 6,306,536 B1 * | 10/2001 | Wilkinson et al. | 429/492 |
| 2003/0114297 A1 * | 6/2003 | Shinn et al. | 502/159 |
| 2003/0170519 A1 | 9/2003 | Mittelstadt et al. | |
| 2005/0037916 A1 | 2/2005 | Chen et al. | |
| 2006/0141336 A1 * | 6/2006 | Takashima et al. | 429/42 |
| 2006/0258759 A1 * | 11/2006 | Shafer et al. | 521/27 |
| 2007/0026291 A1 * | 2/2007 | Kim et al. | 429/40 |

FOREIGN PATENT DOCUMENTS

| | | |
|---|---|---|
| JP | 64-41174 | 2/1989 |
| JP | 3-167752 | 7/1991 |
| JP | 4-169069 | 6/1992 |
| JP | 6-267556 | 9/1994 |
| JP | 9-63622 | 3/1997 |
| JP | 09063622 A * | 3/1997 |
| JP | 9-180728 | 7/1997 |
| JP | 9-194609 | 7/1997 |
| JP | 2004-185930 | 7/2004 |
| JP | 2005-85544 | 3/2005 |
| JP | 2005-214172 | 8/2005 |
| JP | 2005-293923 | 10/2005 |
| JP | 2005327500 A * | 11/2005 |

OTHER PUBLICATIONS

Machine translation of JP 2005-327500 date unknown.*
Office Action for German Appl. No. 112007001512.8-45 dated Nov. 3, 2010.

* cited by examiner

METHOD FOR PRODUCING FUEL CELL ELECTROLYTE MEMBRANE AND METHOD FOR PRODUCING MEMBRANE-ELECTRODE ASSEMBLY

CROSS-REFERENCE TO RELATED APPLICATIONS

This application is a national phase application of International Application No. PCT/JP2007/062643, filed Jun. 18, 2007, and claims the priority of Japanese Application No. 2006-175324, filed Jun. 26, 2006, the contents of both of which are incorporated herein by reference.

TECHNICAL FIELD

The present invention relates to a method for producing a fuel cell electrolyte membrane and a method for producing membrane-electrode assembly using the produced electrolyte membrane.

BACKGROUND ART

A polymer electrolyte fuel cell has been known as one type of fuel cell. Since a polymer electrolyte fuel cell is characterized by low operating temperatures (up to approximately 80° C. to 100° C.), low cost, and its compact size when compared with different types of fuel cells, it is expected to serve as an automobile power source and the like.

As shown in FIG. 4, in a polymer electrolyte fuel cell, a membrane-electrode assembly (MEA) 50, which is used as a main component, is sandwiched by separators 51 each having a fuel (hydrogen) gas channel and an air gas channel such that a single fuel cell 55, referred to as a single cell, is formed. A membrane-electrode assembly 50 has a structure in which an anode-side electrode catalyst layer 53a is laminated on one side of an electrolyte membrane 52 serving as an ion exchange membrane and a cathode-side electrode catalyst layer 53b is laminated on the other side thereof.

A perfluorosulfonic acid polymer thin film (Nafion membrane, DuPont, the U.S.) comprising an electrolyte resin (ion exchange resin) is mainly used as such an electrolyte membrane 52. In addition, since sufficient strength cannot be achieved with the use of a thin film consisting of an electrolyte resin, an electrolyte resin solution may be allowed to impregnate a porous reinforcing membrane (e.g., a thin film prepared by stretching PTFE, polyolefin resin, or the like) such that a reinforced electrolyte membrane is obtained (see Patent Document 1, etc.).

For electrode catalyst layers 53a and 53b, an electrode catalyst material comprising an electrode catalyst such as platinum-supporting carbon and an electrolyte resin is mainly used. A membrane-electrode assembly 50 is obtained by applying such electrode catalyst material to an electrolyte membrane 52 by a screen printing method or the like, followed by drying (see Patent Document 2, etc.).

In view of improvement of power generation performance, it is desirable for a membrane-electrode assembly to have a large effective contact area between an electrolyte membrane and an electrode catalyst layer. In order to achieve such purpose, it has been suggested that a membrane-electrode assembly be obtained by forming recesses and projections on the electrode catalyst layer side in a preliminary step with the use of a press or the like and pressure-welding an electrolyte membrane thereto (see Patent Document 3, etc.).

Patent Document 1: JP Patent Publication (Kokai) No. 9-194609 A (1997)

Patent Document 2: JP Patent Publication (Kokai) No. 9-180728 A (1997)

Patent Document 3: JP Patent Publication (Kokai) No. 2005-293923 A

DISCLOSURE OF THE INVENTION

Problem To Be Solved By the Invention

Any electrolyte membrane comprising a conventional electrolyte resin thin film or reinforced electrolyte membrane produced in a manner as described in Patent Document 1 has a flat surface. When a membrane-electrode assembly is obtained using such a membrane by a conventional method as described in Patent Document 2, the effective contact area between an electrolyte membrane and an electrode catalyst layer remains as the surface area of a flat face. With the use of the method described in Patent Document 3, it is possible to increase the effective contact area between an electrolyte membrane and an electrode catalyst layer as a result of formation of recesses and projections on the electrode catalyst layer side. However, an electrolyte membrane is likely to be damaged when an electrode catalyst layer on which recesses and projections have been formed is pressure-welded to an electrolyte membrane having a flat face. In addition, the presence of the interface between an electrolyte membrane and an electrode catalyst layer makes it impossible to prevent reduction in power generation efficiency of a membrane-electrode assembly caused by interface resistance.

The present invention has been made in view of the above circumstances. It is an objective of the present invention to provide a method for producing a fuel cell electrolyte membrane with which it is possible to increase the effective contact area between an electrolyte membrane and an electrode catalyst layer, and to provide a method for producing a membrane-electrode assembly using such electrolyte membrane, whereby the interface resistance generated between an electrolyte membrane and an electrode catalyst layer is reduced such that power generation performance can be improved.

Means For Solving Problem

The first invention according to the present application relates to a method for producing a fuel cell electrolyte membrane, comprising at least a step of heating and pressing an electrolyte membrane comprising a fluorine-based electrolyte with the use of a plate having recesses and projections on the surface thereof so as to form recesses and projections on the electrolyte membrane surface.

An electrolyte membrane produced by the above production method has recesses and projections on the surface thereof and thus the surface area is increased due to such recesses and projections. Such recesses and projections may be of any size and shape. The size and shape are appropriately determined based on the necessary size of the surface area. In usual cases, the recess depth (or projection height) is several micrometers to several tens of micrometers. Recesses and projections may be formed on a continuous curved surface or may be formed with many concave grooves and columnar concave portions. As an electrolyte resin used as a base material for an electrolyte membrane, a fluorine-based electrolyte made of a precursor polymer for an electrolyte polymer is used in view of its thermal stability. In addition, if necessary, a step of imparting ion exchange properties to an electrolyte polymer via hydrolysis or the like is carried out following a step of forming recesses and projections on the electrolyte membrane surface.

The second invention according to the present application relates to a method for producing a fuel cell electrolyte membrane, comprising at least the following steps: an application step of applying fluorine-based electrolyte particles to the surface of a porous reinforcing membrane; an impregnation step of heating the porous reinforcing membrane, to which electrolyte particles have been applied, with the use of a heated plate, melting the electrolyte particles, and allowing the electrolyte particles to impregnate the porous reinforcing membrane so as to obtain an electrolyte membrane; and a step of pressing the electrolyte membrane with a plate having recesses and projections on the surface thereof so as to form recesses and projections on the electrolyte membrane surface.

As a porous reinforcing membrane used herein, a porous reinforcing membrane prepared by stretching PTFE (polytetrafluoroethylene), a polyolefin resin, or the like which has been used for a conventional reinforced electrolyte membrane in a single axial or biaxial direction can be appropriately used. Fluorine-based electrolyte particles to be applied to the surface of a porous reinforcing membrane are obtained by forming a fluorine-based electrolyte into resin particles, the particle size of which is preferably 100 μm or less and more preferably approximately 0.1 μm to 50 μm.

A porous reinforcing membrane to which fluorine-based electrolyte particles have been applied is heated with a heated plate such that electrolyte particles become molten and impregnate the porous reinforcing membrane. The molten electrolyte impregnates the porous reinforcing membrane without the need to be actively externally pressed. Thus, no damage is caused to the porous reinforcing membrane due to pressing. Next, such reinforced electrolyte membrane impregnated with the electrolyte resin is pressed with a plate having recesses and projections on the surface thereof such that recesses and projections are formed on the electrolyte membrane surface.

A heating plate used to melt electrolyte particles may differ from a pressing plate used to form recesses and projections on the electrolyte membrane surface. In such case, a reinforced electrolyte membrane impregnated with an electrolyte resin is transferred between the two plates. It is also possible to carry out the above two steps in a consecutive manner with the use of a plate comprising a heating means and having recesses and projections on the surface thereof. In such case, electrolyte particles become molten and are allowed to impregnate a porous reinforcing membrane while a plate is maintained in a heated state. Then, the plate is transferred after resin impregnation such that the reinforced electrolyte membrane is pressed, followed by the termination of heating and the initiation of recooling. Accordingly, a reinforced electrolyte membrane having recesses and projections on the surface thereof and comprising a porous reinforcing membrane can be obtained.

Also in the case of the above production method, since fluorine-based electrolyte particles made from a precursor polymer for an electrolyte polymer have thermal stability, they are used as electrolyte resin particles for a base material. If necessary, a step of imparting ion exchange properties to an electrolyte polymer via hydrolysis or the like is further carried out following a step of forming recesses and projections on the reinforced electrolyte membrane surface.

According to the above second invention, at least the impregnation step is preferably carried out in a reduced pressure environment. Thus, deaeration inside the porous reinforcing membrane and substitution of deaerated spaces with the molten electrolyte are promoted. Accordingly, the time period for electrolyte impregnation of the porous reinforcing membrane can be shortened. In addition, a sufficient state of impregnation can be realized. A step of pressing an electrolyte membrane with a plate having recesses and projections on the surface thereof so as to form recesses and projections on the electrolyte membrane surface by may be carried out in a reduced pressure environment.

In addition, the present application further discloses the following method as a method for producing a membrane-electrode assembly using a fuel cell electrolyte membrane produced by the above method: a method for producing a membrane electrode laminate, comprising applying electrode catalyst particles or a mixture of an electrode catalyst resin and fluorine-based electrolyte particles to the surface of an electrolyte membrane, on which recesses and projections have been formed prior to a treatment for imparting ion exchange properties to an electrolyte polymer, so as to obtain a laminate; heating the laminate such that the electrode catalyst layer binds to the electrolyte membrane so as to be combined therewith; and carrying out a treatment for imparting ion exchange properties to an electrolyte polymer.

In the above invention, the electrode catalyst particles used are conventionally known electrode catalyst particles in which a catalyst component such as platinum is supported by a conductive carrier such as carbon. Such particles are obtained by forming a fluorine-based electrolyte resin into fluorine-based electrolyte particles. The particle size thereof is preferably 100 μm or less, more preferably approximately 0.1 μm to 50 μm, and further preferably 1 μm or less.

According to the above method for producing a membrane-electrode assembly, the formed laminate is heated to a temperature at least sufficient to melt a fluorine-based electrolyte resin. The heating temperature is from approximately 200° C. to 270° C. Heating can be carried out by an arbitrary method. However, a method wherein the above laminate is positioned between a pair of heating plates and heating is carried out with the heat generated from heating plates is preferable.

When a fluorine-based electrolyte resin constituting an electrolyte membrane and an electrode catalyst resin are applied, the applied fluorine-based electrolyte particles become molten by heating. Then, the molten fluorine-based electrolyte resin acts as a binder and thus binds to applied electrode catalyst particles so as to be combined therewith. Thus, a membrane-electrode assembly is obtained under a condition in which an electrolyte membrane having recesses and projections formed on the surface thereof binds to an electrode catalyst layer comprising electrode catalyst particles so as to be combined therewith while there is no gap therebetween or there are few, if any, gaps therebetween. Then, the obtained membrane-electrode assembly is subjected to a treatment for imparting ion exchange properties to an electrolyte polymer, such as hydrolysis. The resulting membrane electrode laminate has an increased effective contact area between an electrolyte layer and an electrode catalyst layer and further has a significantly reduced interface resistance. Thus, a membrane electrode laminate having high power generation efficiency and a long lifetime can be obtained.

In addition, it is obviously possible to obtain a membrane-electrode assembly by applying a conventionally known electrode catalyst ink to the electrolyte membrane produced by the present invention, followed by drying. In such case, it is preferable to subject an electrolyte membrane to a treatment for imparting ion exchange properties to an electrolyte polymer, such as hydrolysis, before applying an electrode catalyst ink.

According to the present invention, an electrolyte membrane has recesses and projections on the surface thereof such that the effective contact area between the electrolyte membrane surface and an electrode catalyst layer can be increased. Further, the interface resistance generated between the electrolyte membrane surface and the electrode catalyst layer can be reduced in a membrane-electrode assembly. Thus, a membrane-electrode assembly having high power generation performance can be obtained.

EXPLANATION OF REFERENCE NUMERALS

1: fluorine-based electrolyte membrane as a starting material; 2a, 2b: recesses and projections formed on an electrolyte membrane; 3: the electrolyte membrane of the present invention; 3A: the reinforced electrolyte membrane of the present invention; 4: porous reinforcing membrane; 5, 8: fluorine-based electrolyte resin particle; 6: laminate; 7: electrode catalyst particle; 10a, 10b: heating plate; 11: recesses and projections of a heating plate; 12: shielding wall; 13: shield space; 15: vacuum pump; 21: electrode catalyst layer; and 20: membrane-electrode assembly.

BEST MODE FOR CARRYING OUT THE INVENTION

Figure 1:
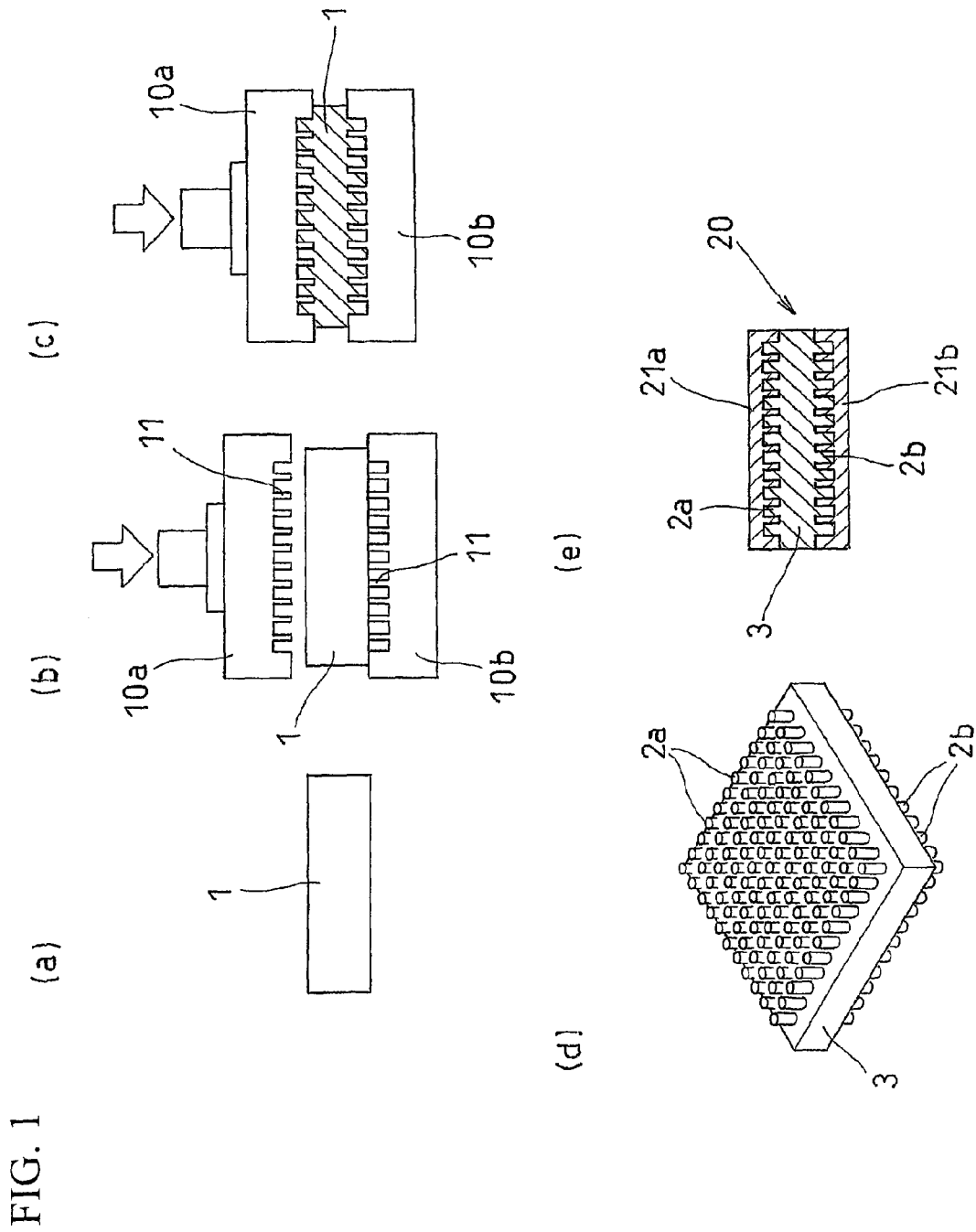
FIG. 1 is an explanatory diagram of one embodiment of the method for producing a fuel cell electrolyte membrane of the present invention.
Figure 2:
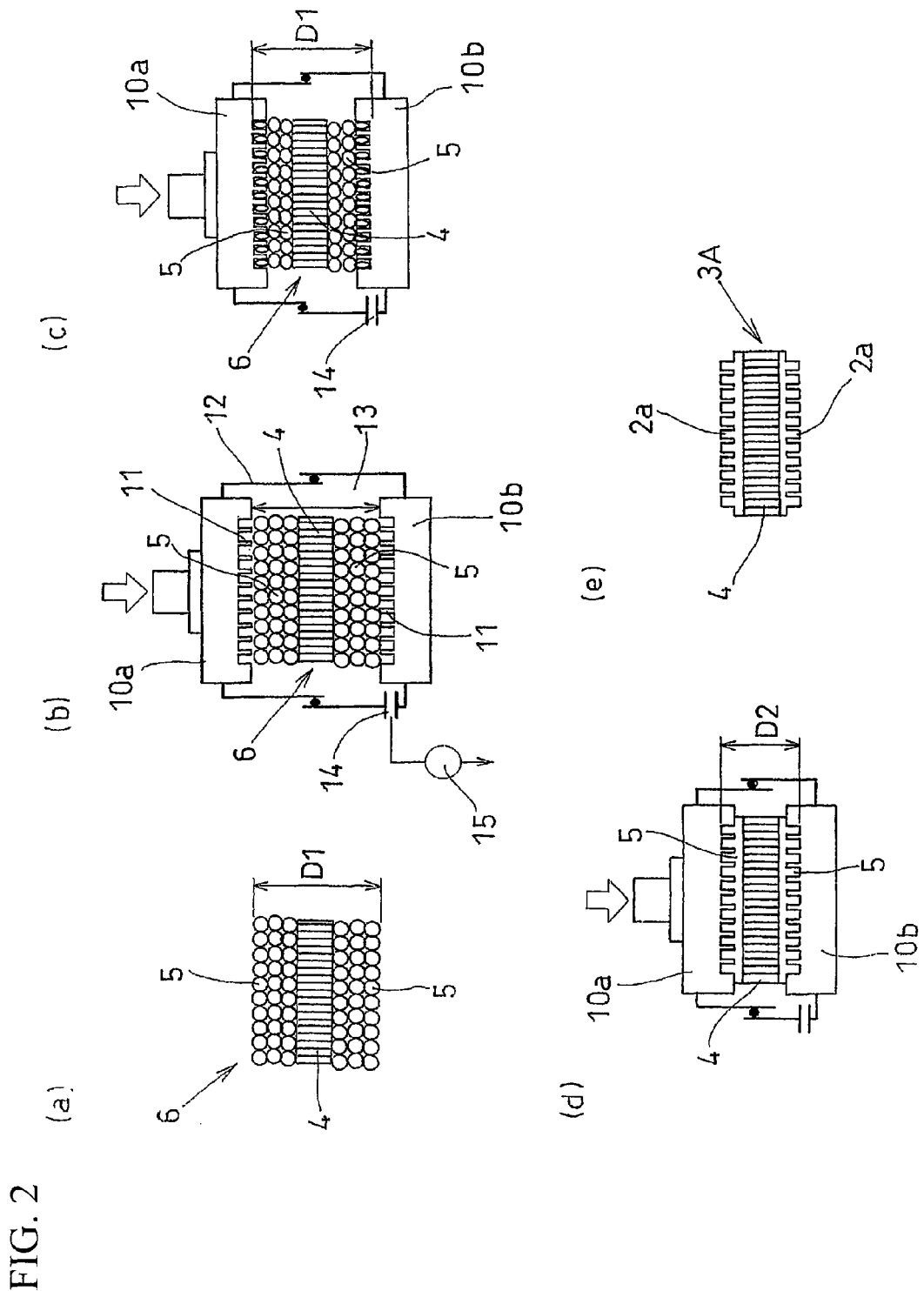
FIG. 2 is an explanatory diagram of another embodiment of the method for producing a fuel cell electrolyte membrane of the present invention.
Figure 3:
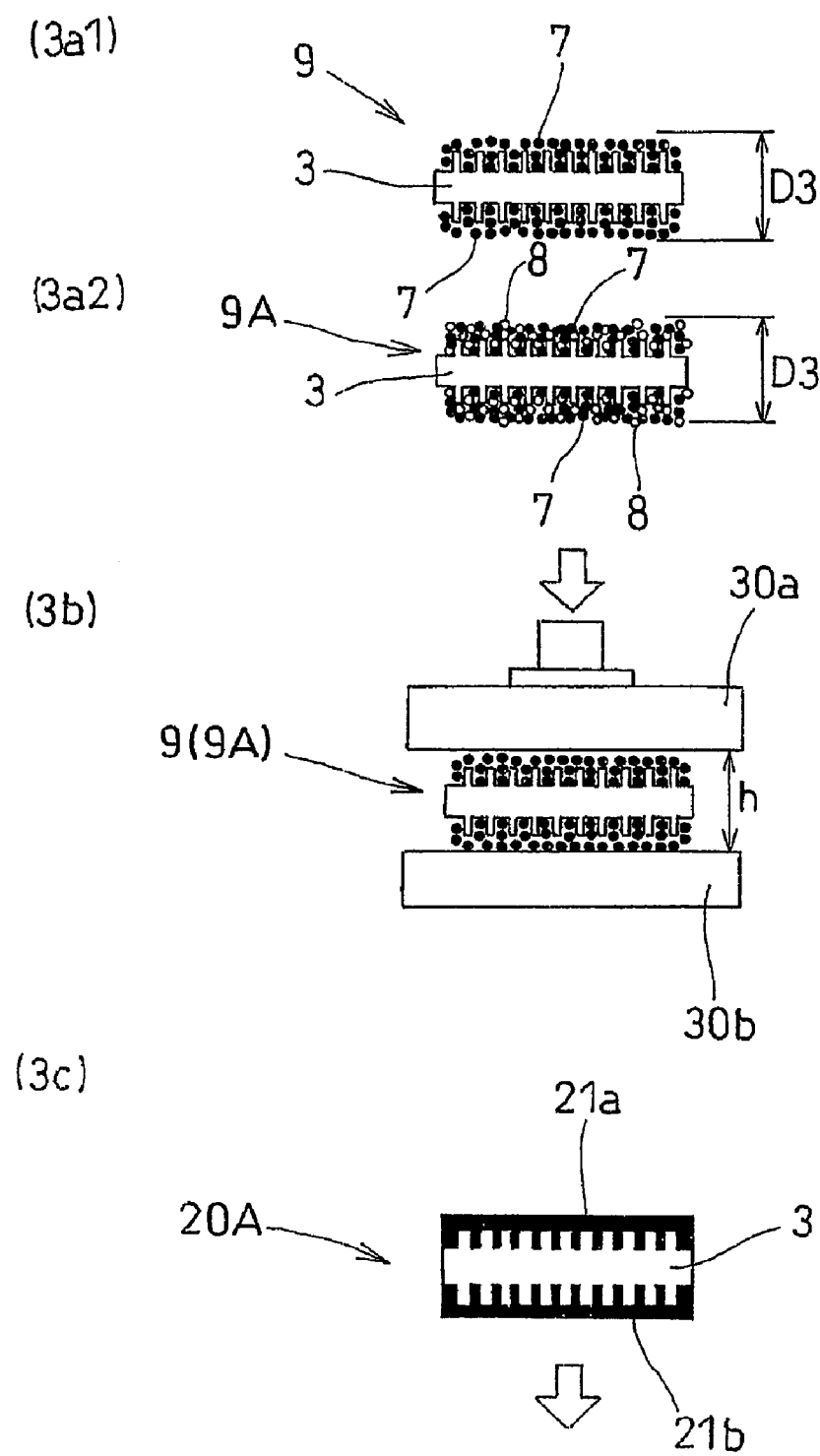
FIG. 3 is an explanatory diagram of one embodiment of the production of the membrane-electrode assembly of the present invention with the use of a prepared fuel cell electrolyte membrane.
Figure 4:
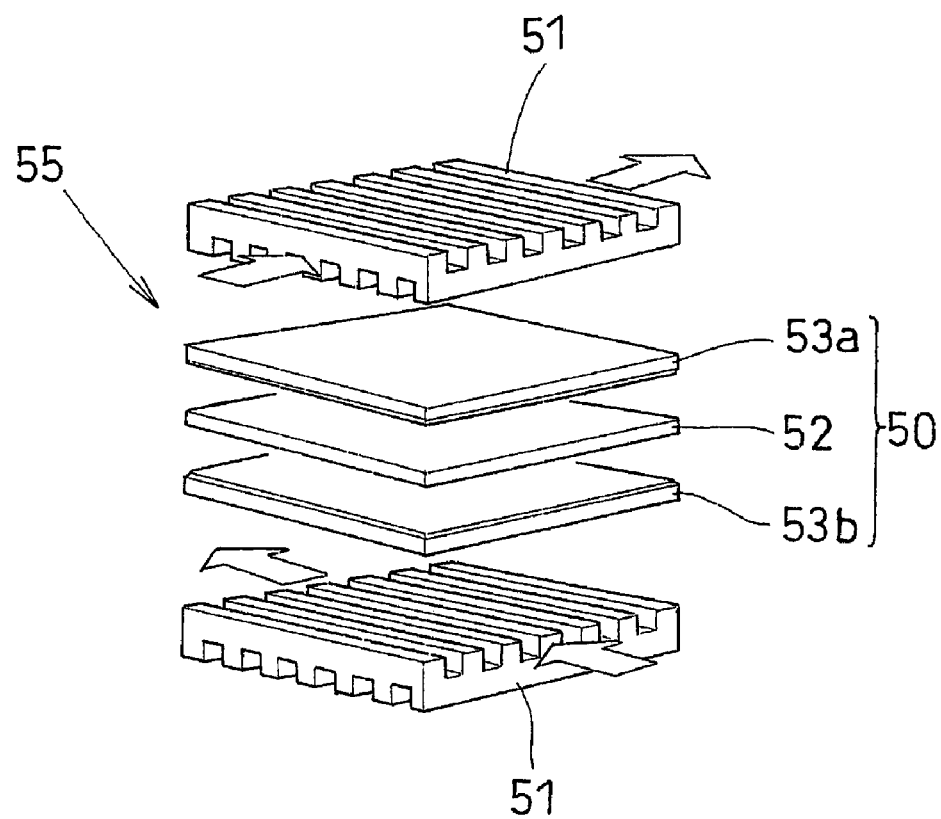
FIG. 4 schematically shows one embodiment of a fuel cell.

Hereinafter, the present invention is described based on the embodiments thereof with reference to the drawings. FIGS. 1 and 2 show explanatory diagrams of the method for producing a fuel cell electrolyte membrane of the present invention. FIG. 3 is an explanatory diagram of one embodiment of the production of the membrane-electrode assembly of the present invention with the use of a prepared fuel cell electrolyte membrane.

In the embodiment shown in FIG. 1, a fluorine-based electrolyte membrane 1 (thickness: approximately 25 μm to 70 μm) is used as a starting material (FIG. 1a). The electrolyte membrane 1 is positioned between upper and lower heating plates 10a and 10b each having recesses and projections 11 on the surface thereof (FIG. 1b). The electrolyte membrane 1 is heated and pressed by lowering the heating plate 10a (FIG. 1c). The temperatures of heating plates 10a and 10b are preferably approximately 170° C. to 300° C.

The depth of a recess (or the height of a projection) formed on each surface of heating plates 10a and 10b is preferably approximately several micrometers to several tens of micrometers. In addition, recesses and projections may be formed on a continuous curved surface or may be formed with many concave grooves. As shown in FIG. 1, many columnar portions may be formed. When such recesses and projections are formed on heating plates 10a and 10b, the surface areas of the plates can be increased to become approximately four times as large as the areas when the plates have flat faces.

After the maintenance of heating and pressing conditions for a certain period of time, cooling is carried out and then plates 10a and 10b are opened. Accordingly, as schematically shown in FIG. 1d, an electrolyte membrane 3 can be obtained, such membrane having recesses and projections 2a and 2b on the surface thereof, which are obtained by transferring recesses and projections 11 formed on each surface of the heating plates 10a and 10b. When recesses and projections 2a and 2b are formed on the surface of an electrolyte membrane 3, the effective surface area thereof can be increased to become greater than that of the original electrolyte membrane 1. In addition, recesses and projections 2a and 2b formed on the surface thereof are formed by heating and pressing the fluorine-based electrolyte membrane 1. Thus, such recesses and projections are fixed in such state.

The embodiment shown in FIG. 2 corresponds to the case of production of a reinforced electrolyte membrane 3A. Herein, a conventionally known porous PTFE membrane is used as a porous reinforcing membrane 4. At first, as shown in FIG. 2a, fluorine-based electrolyte resin particles 5 each having a particle size of approximately 0.1 μm to 50 μm are applied to the surface of the porous reinforcing membrane 4 such that a laminate 6 (thickness: D1) is prepared. The laminate 6 is positioned between upper and lower heating plates 10a and 10b each having recesses and projections 11 on the surfaces thereof (FIG. 2b).

In the above example, the position of the upper heating plate 10a can be controlled at the micrometer-level by a controlling mechanism comprising a servomotor (not shown). In addition, the space between the lower heating plate 10b and the upper heating plate 10a is covered with a shielding wall 12 such that a shield space 13 is formed therein. Further, an opening 14 formed on a portion of the shielding wall 12 is connected to a vacuum pump 15 such that the shield space 13 can be depressurized.

The upper and lower heating plates 10a and 10b are heated to a temperature of approximately 170° C. to 300° C. Further, the vacuum pump 15 is operated such that the shield space 13 inside the shielding wall 12 is maintained in a depressurized state. As a result of such depressurization, deaeration inside pores of the porous reinforcing membrane 4 is promoted. Thus, impregnation of the pores with a molten electrolyte resin (described below) progresses in a short period of time.

The upper heating plate 10a is lowered by operating the controlling mechanism until the distance between the upper and lower heating plates 10a and 10b becomes equivalent to the thickness of the laminate 6 (D1). As a result, the upper and lower surfaces of the laminate 6 come into contact with the surfaces of the heating plates 10a and 10b, respectively. Heating is carried out while such contact state is maintained. Thereafter, the heating plate 10a is lowered by several micrometers and stopped at such position (FIG. 2c). Accordingly, the effects derived from variations on the resin surface are suppressed and heat variations inside the resin surface are equalized such that resin fluidity can be improved substantially without changes in the thickness of the laminate 6. Thus, molten fluorine-based electrolyte resin particles 5 uniformly impregnate the porous reinforcing membrane 4. The shield space 13 inside the shielding wall 12 is in a reduced pressure environment and thus the rate of molten resin impregnation is accelerated. Even if such space is not in a reduced pressure environment, a vacuum pump 15 may be stopped as long as molten resin impregnation smoothly progresses.

After resin impregnation, the upper heating plate 10a is lowered until the above distance becomes equivalent to D2, corresponding to the thickness of an electrolyte membrane 3A (to be obtained) (FIG. 2d). Thus, recesses and projections are formed on the electrolyte membrane surface by transferring recesses and projections 11 formed on each surface of the heating plates 10a and 10b. After the elapse of a certain period of time, heating of the upper and lower heating plates 10a and 10b is terminated, followed by cooling. Then, the heating plates 10a and 10b are opened. Accordingly, as schematically shown in FIG. 2e, a reinforced electrolyte membrane 3A can be obtained, such membrane having recesses and projections 2a and 2b on the surface thereof, which are obtained by transferring recesses and projections 11 formed on each surface of the heating plates 10a and 10b.

With the use of the aforementioned electrolyte membrane 3 and the reinforced electrolyte membrane 3A, a membrane-electrode assembly can be produced by a conventionally known method. In such case, according to the present invention, a fluorine-based electrolyte resin having good thermal stability is used as an electrolyte resin. Thus, an electrolyte membrane 3 (3A) is subjected to a treatment for imparting ion exchange properties to an electrolyte polymer by a conventionally known method. Ion exchange properties are imparted by hydrolysis or the like. Then, for instance, as shown in FIG. 1e as an example, an electrode catalyst ink comprising an electrode catalyst such as platinum-supporting carbon, an electrolyte resin, and a solvent is applied to the electrolyte membrane 3 (3A) by a screen printing method or the like, followed by drying. Thus, an anode-side electrode catalyst layer 21a and a cathode-side electrode catalyst layer 21b are formed. Accordingly, a membrane-electrode assembly 20 can be obtained. Regarding such membrane-electrode assembly 20, the real surface area of the electrolyte membrane 3 (3A) is increased since recesses and projections 2a and 2b have been formed on the surface. Thus, it is possible to increase the effective contact areas between the electrolyte membrane 3 (3A) and electrode catalyst layers 21a and 21b. Therefore, a membrane-electrode assembly having improved power generation performance can be obtained.

Another method for producing a membrane-electrode assembly using the above electrolyte membrane 3 and the reinforced electrolyte membrane 3A is described with reference to FIG. 3. In addition, the electrolyte membrane 3 is used for explanation below. However, the same applies to the reinforced electrolyte membrane 3A. At first, electrode catalyst particles 7 (shown in FIG. 3a1) or a mixture of electrode catalyst particles 7 and fluorine-based electrolyte particles 8 (shown in FIG. 3a2) are applied to the surface of an electrolyte membrane 3 such that a laminate 9 or 9A having the thickness of D3 is obtained.

As shown in FIG. 3b, a laminate 9 (9A) is positioned between heating plates 30a and 30b heated to 170° C. to 300° C. and maintained in a heated state, provided that the distance between the heating plates 30a and 30b is designated as "h" (D3—several micrometers). Thus, a fluorine-based electrolyte resin is allowed to become molten substantially without changes in the laminate thickness. In addition, in the case of a laminate 9, a fluorine-based electrolyte resin to become molten is contained in a portion on the surface of a fluorine-based electrolyte resin constituting a membrane-electrode assembly 3. In the case of a laminate 9A, a fluorine-based electrolyte resin to become molten is contained in both a portion on the surface of a fluorine-based electrolyte resin constituting a membrane-electrode assembly 3 and applied fluorine-based electrolyte particles 8.

The molten fluorine-based electrolyte resin acts as a binder and thus binds to applied electrode catalyst particles 7 so as to be combined therewith. Accordingly, an electrolyte membrane 3 (3A) having recesses and projections formed on the surface thereof binds to an electrode catalyst layer comprising electrode catalyst particles 7 so as to be combined therewith substantially without the presence of an interface therebetween. After cooling, heating plates 30a and 30b are opened. As a result, a membrane-electrode assembly 20A can be obtained, such assembly being formed by laminating an anode-side electrode catalyst layer 21a and a cathode-side electrode catalyst layer 21b on both sides of an electrolyte membrane 3 (schematically shown in FIG. 3) so as to combine them together. Then, the membrane-electrode assembly is subjected to a treatment such as hydrolysis such that ion exchange properties are imparted to an electrolyte polymer.

The invention claimed is:

1. A method for producing a fuel cell electrolyte membrane, comprising:
   applying fluorine-based electrolyte particles to a surface of a porous reinforcing membrane;
   impregnating the porous reinforcing membrane, the impregnating comprising heating the porous reinforcing membrane, to which electrolyte particles have been applied, with the use of a heated plate having recesses and projections on a surface thereof, melting the electrolyte particles, and allowing the electrolyte particles to impregnate the porous reinforcing membrane so as to obtain an electrolyte membrane; and
   pressing the electrolyte membrane with the heated plate having recesses and projections on the surface thereof so as to form recesses and projections on a surface of the electrolyte membrane.

2. The method for producing a fuel cell electrolyte membrane according to claim 1, wherein at least the impregnating is carried out in a reduced pressure.

3. The method for producing a fuel cell electrolyte membrane according to claim 1, wherein the method further comprises imparting ion exchange properties to an electrolyte polymer constituting the electrolyte membrane having recesses and projections formed thereon.

4. A method for producing a membrane-electrode assembly using a fuel cell electrolyte membrane produced by a method, comprising:
   applying fluorine-based electrolyte particles to a surface of a porous reinforcing membrane;
   impregnating the porous reinforcing membrane, the impregnating comprising heating the porous reinforcing membrane, to which electrolyte particles have been applied, with the use of a heated plate having recesses and projections on a surface thereof, melting the electrolyte particles, and allowing the electrolyte particles to impregnate the porous reinforcing membrane so as to obtain an electrolyte membrane; and
   pressing the electrolyte membrane with the heated plate having recesses and projections on the surface thereof so as to form recesses and projections on a surface of the electrolyte membrane,
   applying electrode catalyst particles or a mixture of an electrode catalyst resin and fluorine-based electrolyte particles to the surface of the electrolyte membrane, on which recesses and projections have been formed, so as to obtain a laminate;
   heating the laminate such that the electrode catalyst layer binds to the electrolyte membrane so as to be combined therewith; and
   carrying out a treatment for imparting ion exchange properties to an electrolyte polymer constituting the electrolyte membrane.

* * * * *